(12) United States Patent
Demissie (10) Patent No.: US 11,713,750 B2
(45) Date of Patent: Aug. 1, 2023

(54) BEARING ARRANGEMENT FOR A WIND TURBINE AND WIND TURBINE

(71) Applicant: Siemens Gamesa Renewable Energy A/S, Brande (DK)

(72) Inventor: Edom Demissie, Sheffield (GB)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 102 days.

(21) Appl. No.: 16/874,309

(22) Filed: May 14, 2020

(65) Prior Publication Data
US 2020/0362835 A1 Nov. 19, 2020

(30) Foreign Application Priority Data

May 16, 2019 (EP) .................................... 19174891

(51) Int. Cl.
*F03D 80/70* (2016.01)
*F03D 9/25* (2016.01)
(Continued)

(52) U.S. Cl.
CPC ............... *F03D 80/70* (2016.05); *F03D 9/25* (2016.05); *F03D 15/00* (2016.05); *F16C 17/02* (2013.01); *F16C 2360/31* (2013.01)

(58) Field of Classification Search
CPC ........ F03D 80/70; F03D 9/25; F16C 32/0633; F16C 2360/31; F05B 2240/21
See application file for complete search history.

(56) References Cited

U.S. PATENT DOCUMENTS

| 9,115,696 B2* | 8/2015 | Rodriguez Tsouroukdissian ........ F03D 15/20 |
| 9,765,817 B1* | 9/2017 | Chen ........................ F16C 43/02 |

(Continued)

FOREIGN PATENT DOCUMENTS

| CN | 107191474 A | 9/2017 |
| CN | 108757351 A | 11/2018 |

(Continued)

OTHER PUBLICATIONS

Meriam-Webster online dictionary: (https://www.merriam-webster.com/dictionary/attached), 2022 (Year: 2022).*

(Continued)

*Primary Examiner* — Courtney D Heinle
*Assistant Examiner* — Ryan C Clark
(74) *Attorney, Agent, or Firm* — Schmeiser, Olsen & Watts LLP (57) ABSTRACT

A bearing arrangement for a wind turbine including a bearing housing and a drive shaft, whereby the drive shaft is arranged within the bearing housing in an axial direction along a longitudinal axis of the bearing housing, the bearing arrangement further includes a downwind bearing and an upwind bearing, whereby the downwind bearing and the upwind bearing are arranged between the bearing housing and the drive shaft, wherein the downwind bearing and/or the upwind bearing is a radial bearing including multiple radial bearing pads, whereby each one of the multiple radial bearing pads is attached to one of a multiple radial bearing bodies of the radial bearing and the multiple radial bearing pads are arranged about the drive shaft is provided.

12 Claims, 12 Drawing Sheets

(51) Int. Cl.
*F03D 15/00* (2016.01)
*F16C 17/02* (2006.01)

(56) References Cited

U.S. PATENT DOCUMENTS

| | | | | |
|---|---|---|---|---|
| 2007/0127858 | A1* | 6/2007 | Nakagawa | F16C 23/086 |
| | | | | 384/495 |
| 2012/0121420 | A1* | 5/2012 | Yuki | F16C 33/64 |
| | | | | 416/174 |
| 2012/0228878 | A1* | 9/2012 | Perner | F03B 13/264 |
| | | | | 29/897.3 |
| 2014/0169952 | A1* | 6/2014 | Pedersen | F16H 57/021 |
| | | | | 415/170.1 |
| 2015/0017000 | A1* | 1/2015 | Sato | F16C 17/10 |
| | | | | 416/174 |
| 2015/0125104 | A1* | 5/2015 | Kullin | F16C 19/545 |
| | | | | 384/558 |
| 2017/0260970 | A1* | 9/2017 | Stiesdal | F16C 17/10 |
| 2018/0306247 | A1 | 10/2018 | Plogmann et al. | |
| 2019/0032708 | A1 | 1/2019 | Gust et al. | |
| 2019/0085829 | A1 | 3/2019 | Frydendal et al. | |
| 2019/0085830 | A1* | 3/2019 | Frydendal | F03D 80/70 |
| 2019/0390658 | A1* | 12/2019 | Heuser | F16C 33/583 |

FOREIGN PATENT DOCUMENTS

| | | |
|---|---|---|
| CN | 109519343 A | 3/2019 |
| EP | 3276192 A1 | 1/2018 |
| EP | 3434917 A1 | 1/2019 |
| WO | 2018024410 A1 | 2/2018 |

OTHER PUBLICATIONS

Extended European Search Report in corresponding European Patent Application No. 19174891.2 dated Oct. 22, 2019. 8 pages.

* cited by examiner

BEARING ARRANGEMENT FOR A WIND TURBINE AND WIND TURBINE

CROSS-REFERENCE TO RELATED APPLICATIONS

This application claims priority to European Patent Application No. 19174891.2, having a filing date of May 16, 2019, the entire contents of which are hereby incorporated by reference.

FIELD OF TECHNOLOGY

The following relates to a bearing arrangement for a wind turbine and a wind turbine.

BACKGROUND

In general, bearing arrangements of wind turbines comprise a bearing housing and a drive shaft, whereby the drive shaft is arranged within the bearing housing in an axial direction along a longitudinal axis of the bearing housing. Bearings of the bearing arrangement are arranged about the drive shaft, so that the drive shaft can be rotated within the bearing housing by means of a rotor of the wind turbine. Such a bearing arrangement is known from EP 3 276 192 A1, for example.

Such a bearing may be a radial bearing comprising multiple radial bearing bodies, multiple radial tiltable support structures secured to the multiple radial bearing bodies, whereby each one of a multiple of radial bearing pads is attached to one of the multiple radial tiltable support structures. In addition to the radial bearings, an axial bearing is required to hold positive thrust from the wind. The axial bearing is a separate bearing arranged in between the bearing housing and the drive shaft. It requires its own assembly space, bearing components and lubrication system.

SUMMARY

An aspect relates to eliminating or at least reducing disadvantages in the prior art techniques related to the arrangement of radial and axial bearings in the bearing housing, in particular to provide a bearing arrangement for a wind turbine with a simple and cost-effective bearing concept.

An aspect relates to a bearing arrangement of a wind turbine and a wind turbine Thereby, the features and details described in connection with the bearing arrangement of the present invention apply in connection with the wind turbine of the invention, so that regarding the disclosure of the individual aspects of the present invention it is or can be referred to one another.

According to a first aspect of the present invention, the present invention relates to a bearing arrangement for a wind turbine comprising a bearing housing and a drive shaft, whereby the drive shaft is arranged within the bearing housing in an axial direction along a longitudinal axis of the bearing housing, the bearing arrangement further comprising a downwind bearing and an upwind bearing, whereby the downwind bearing and the upwind bearing are arranged between the bearing housing and the drive shaft, wherein the downwind bearing and/or the upwind bearing is a radial bearing comprising multiple radial bearing pads, whereby each one of the multiple radial bearing pads is attached to one of a multiple radial bearing bodies of the radial bearing and the multiple radial bearing pads are arranged about the drive shaft, whereby the downwind bearing and/or the upwind bearing is connected to an axial bearing of the bearing arrangement, whereby at least one axial bearing pad of the axial bearing is attached to at least one of the multiple radial bearing bodies.

In particular, the downwind bearing is connected to an axial bearing of the bearing arrangement. Moreover, in particular, each of a multiple of axial bearing pads of the axial bearing is attached to one of the multiple radial bearing bodies.

By means of the embodiment of the present invention, the radial bearing and the axial bearing are combined in a cost-effective and simple way.

The downwind bearing is in particular arranged about a downwind portion of the drive shaft. The upwind bearing is in particular arranged about an upwind portion of the drive shaft. The downwind bearing may alternatively be referred to as a back-end bearing arranged about a back-end portion of the drive shaft. The upwind bearing may alternatively be referred to as a front-end bearing arranged about a front-end portion of the drive shaft. In a wind turbine, the front-end of the drive shaft is located closer to the rotor than its back-end.

At least one axial bearing pad is attached to the at least one of the multiple radial bearing bodies by means of an axial tiltable support structure. The axial tiltable support structure provides a tilting functionality of the axial bearing for compensation of tolerances in the radial fluid bearing.

Further, the at least one of the multiple radial bearing bodies comprises a radial bearing body protrusion extending in an axial direction along the longitudinal axis and to which the axial tiltable support structure of the at least one axial bearing pad is attached. Thereby, a stable yet space-saving design of the bearing is achieved.

Moreover, the at least one axial bearing pad and at least one of the multiple radial bearing pads are fluidically connected to each other. Thereby, the lubrication of the axial bearing and the radial bearing can be combined effectively reducing a lubrication effort.

At least one axial bearing pad and the multiple radial bearing pads are enclosed in a common lubricant flooded chamber, whereby the lubricant flooded chamber is sealed against the drive shaft, an internal space of the bearing housing and an outside of the bearing housing. Thereby, the lubricant inside the lubricant flooded chamber cannot leave the lubricant flooded chamber other than by means of leakage. The lubricant flooded chamber in the sense of the present invention therefore is a chamber flooded with lubricant, whereby the lubricant is contained in the lubricant flooded chamber. The lubricant may be oil, for example. Thereby, a passive lubrication system is provided, in which the lubricant is contained. Due to the lubricant not being circulated through several lines and pumps, the provided passive lubrication system requires little maintenance, is less susceptible to failure, simple and cost-efficient.

The axial bearing comprises an axial collar arranged opposite of the at least one axial bearing pad. The axial collar functions as a stop for the at least one axial bearing pad. In particular, the axial collar may be arranged on the drive shaft. Moreover, the axial collar may be integrally formed with the drive shaft, in particular monolithically designed with the drive shaft. The axial collar may in particular extend outwards of the drive shaft. In other words, the axial collar may extend radially outwards relative to a cylindrical surface of the drive shaft.

The axial bearing comprises at least one slack bearing pad arranged opposite of a second contacting surface of the axial collar, wherein the second contacting surface is facing an opposite direction of a first contacting surface of the axial collar, wherein the first contacting surface of the axial collar is arranged facing the at least one axial bearing pad. Thereby, a negative thrust, i.e. a thrust in a direction opposite of the wind, can be held by the axial bearing. In particular, multiple slack bearing pads may be arranged opposite of the second contacting surface of the axial collar.

At least one slack bearing pad is attached to the bearing housing, in particular by means of a flange. The at least one slack bearing pad may be in particular locked by the flange, in particular by means of connection means such as bolts, for example. The flange may be attached to or formed integrally with an inner shell surface and/or inner circumference of the bearing housing. Thereby, a simple and cost-effective structure for the slack bearing pad is provided.

Further, the axial collar is arranged about a circumference of the drive shaft. In particular, the axial collar may be arranged about an entire circumference of the drive shaft.

Moreover, the axial collar is coated with a hardened material. The hardened material may be cold sprayed onto the axial collar, for example. Thereby, the axial collar comprises high resilience and a high service life.

The multiple radial bearing bodies are arranged adjacent to one another along a circumference of a cylindrical seat. The cylindrical seat may be formed in the bearing housing. In particular, the cylindrical seat may be formed by an inner shell surface of the bearing housing. Moreover, the cylindrical seat may be integrally formed, in particular monolithically designed, with the bearing housing. Thereby, the cylindrical seat of the radial bearing is stably provided at the bearing housing.

Each one of the multiple radial bearing pads is attached to one of the multiple radial bearing pads by means of a radial tiltable support structure, whereby in particular the radial tiltable support structure is connected to at least one of the multiple radial bearing bodies by means of a spring connection. The multiple radial tiltable support structures allow for the multiple radial bearing pads to be tiltable with respect to the drive shaft. Thereby, tolerances between the drive shaft and the radial bearing pads can be compensated for. At least one of the multiple radial tiltable support structures may comprise a ball head. The ball head can provide a tilting functionality for compensation of tolerances in the radial bearing. Moreover, the at least one of the multiple radial bearing bodies securing the at least one of the multiple radial tiltable support structures comprising the ball head may comprise a ball socket for the ball head.

At least one curved interface plate may be attached to at least one of the multiple radial bearing bodies opposite of the radial bearing pad, whereby the interface plate is arranged in contact with the cylindrical seat of the radial bearing. Thereby, the radial bearing pads are arranged with respect to the drive shaft with very little tolerances and at low cost with respect to manufacture and assembly. A curved interface plate may be attached to each one of the multiple radial bearing bodies opposite of the radial bearing pad, whereby the interface plates are arranged in contact with a cylindrical seat of the radial bearing. A first interface plate side of the at least one interface plate, which is contact with the cylindrical seat, may have a curvature corresponding to a curvature of the cylindrical seat. Thereby, the interface plate may be provided with a large contact surface contacting the cylindrical seat, whereby the stability of the radial bearing is improved. Further, a second interface plate side of the at least one interface plate, which is located opposite of the first interface plate, may be predominantly plain or plain. Predominantly in this sense means that more than half of the surface of the second interface plate side is plain. Thereby, attachment of the radial bearing body to the interface plate may be facilitated. At least one of the at least one interface plate may comprise at least one interface plate attachment means for attaching the at least one interface plate to the at least one of the multiple radial bearing bodies. The at least one of the multiple radial bearing bodies may comprise a corresponding radial bearing body attachment means. The interface plate attachment means and the corresponding radial bearing body attachment means may be attached to each other by a further attachment means element. Thereby, the interface plate may be securely attached to radial bearing body. At least one of the at least one interface plate attachment means may be an interface plate through hole. The interface plate through hole may comprise threads, for example. A radial bearing body attachment means may further be a radial bearing body through hole, which also may comprise threads. An attachment means element may be a bolt, in particular a threaded bolt, for example.

The at least one of the multiple radial bearing bodies to which the at least one interface plate is attached may be fixed by means of limit stops attached to the cylindrical seat, whereby the limit stops are adjacent to the at least one of the multiple radial bearing bodies in a tangential direction along the circumference of the cylindrical seat. In particular, the limit stops may be arranged in grooves arranged in the cylindrical seat. Further, the limit stops may be attached to the cylindrical seat by means of bolts. In particular, each one of the multiple radial bearing bodies is separated by another one of the multiple radial bearing bodies by means of one of the limit stops along the cylindrical seat. The limit stops prevent a movement of the interface plate in a tangential direction along the circumference of the cylindrical seat. The at least one of the multiple radial bearing bodies to which the at least one interface plate is attached may be fixed to the cylindrical seat by means of at least one fastening element, whereby the at least one fastening element at least partially extends through the at least one of the multiple radial bearing bodies. At least two fastening elements may be extending at least partially through the at least one of the multiple radial bearing bodies. In particular, the at least one fastening element may protrude into the cylindrical seat. The fastening element may be a bolt, for example. The at least one fastening element prevents a movement of the interface plate in a radial direction from the bearing housing to the drive shaft.

Alternatively, the multiple bearing bodies are arranged adjacent to one another along a circumference of a cylindrical seat of the bearing housing, whereby adjacent bearing bodies are locked in movement relative to one another and relative to the cylindrical seat by means of a press-fitted locking piece. The locking pieces may protrude above the adjacent bearing bodies. Further, the locking pieces may protrude in such a way above the adjacent bearing bodies that there is a space between the locking pieces and the bearing bodies. The locking pieces may intrude into the cylindrical seat. The locking pieces may, for example, be arranged in grooves of the cylindrical seat. The locking pieces may than also be referred to as slide-in locking pieces as they can be easily slid into the groove of the cylindrical seat in an axial direction along the longitudinal axis of the bearing housing. The locking pieces may provide dovetail connections with the cylindrical seat. Bottom portions of the locking pieces may extend in tangential directions along the circumference of the cylindrical seat. For example, undercuts in grooves may extend in a tangential direction of the circumference of the cylindrical seat. At least one of the locking pieces may be a T-bar element or an I-bar element. Furthermore, all locking pieces may be T-bar and/or I-bar elements. T-bar elements substantially have the shape of a T and I-bar elements substantially have the shape of an I when viewed along an axial direction along the longitudinal axis of the bearing housing. At least one spring element may be arranged between the at least one of the locking pieces and one of the adjacent radial bearing bodies. The at least one spring element may be in particular arranged between an upper part of the locking piece and a top surface of the one radial bearing body. In particular, two spring elements may be arranged between the at least one of the locking pieces and one of the adjacent radial bearing bodies. The two spring elements are separated from one another, in particular by means of the locking piece which is arranged in between the two spring elements. The spring elements support the locking pieces in locking the radial bearing bodies against the cylindrical seat in a radial direction by providing pretension. The radial direction is a direction from the cylindrical seat to the drive shaft. A rigid element may be arranged between the at least one spring element and the at least one of the adjacent bearing bodies. The rigid element may be made from metal, for example. The spring element may be an elastomer. The locking piece may comprise a stop plate arranged against a rim of the cylindrical seat in an axial direction along the longitudinal axis. The stop plate may be connected to the rim of the cylindrical seat by means of bolts, for example. Thereby, the movement of the bearing bodies in an axial direction along the longitudinal axis is locked. At least one wear protection element may be arranged between at least one of the locking pieces and the cylindrical seat or a radial bearing body. In particular, at least two wear protection elements may be arranged between the locking pieces and the cylindrical seat, whereby the wear protection elements are separated from one another by means of the locking pieces. Further, in particular, at least two wear protection elements may be arranged between the locking pieces and the radial bearing bodies, whereby the wear protection elements are separated from one another by means of the locking pieces and each one of the at least two wear protection elements is in contact with only one of the radial bearing bodies. The wear protection elements may comprise or be made from a polymer, in particular a thermosetting polymer. The wear protection elements reduce the risk of fretting of the locking piece.

According to a second aspect of the embodiment of the present invention, the present invention relates to a wind turbine comprising a bearing arrangement according to the present invention, whereby the wind turbine further comprises a rotor connected to drive the drive shaft and a generator connected to be driven by the drive shaft.

The generator may be a direct drive generator or a geared generator having a gearbox, for example. The rotor is also commonly referred to as a hub of the wind turbine. Two, three or more wind turbine blades may be attached to the rotor or hub. The wind turbine may further comprise a nacelle, which may be supported on a tower of the wind turbine. The nacelle may comprise the bearing arrangement. The bearing arrangement, in particular the bearing housing, and the generator may be attached to the nacelle and/or the tower.

BRIEF DESCRIPTION

Some of the embodiments will be described in detail, with reference to the following figures, wherein the designations denote like members, wherein.

DETAILED DESCRIPTION

Same objects in FIGS. 1 to 12 are denominated with the same reference number. If there is more than one object of the same kind in one of the figures, the objects are numbered in ascending order with the ascending number of the object being separated from its reference number by a dot. The specific dimensions of features and parts in the figures are exemplary and may be enlarged for ease of reference only.

Figure 1:
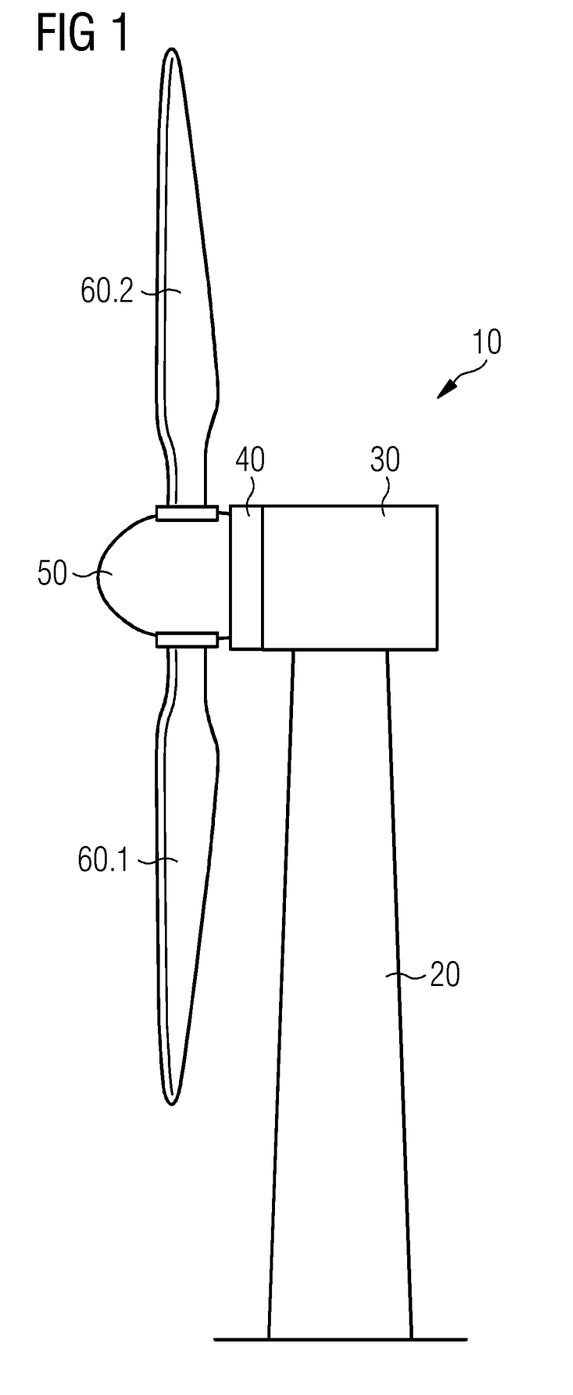
FIG. 1 depicts a side view on a wind turbine.

FIG. 1 shows a side view on a wind turbine 10. The wind turbine 10 comprises a supporting tower 20 and a nacelle 30, whereby the nacelle 30 is attached to the supporting tower 20. The nacelle 30 comprises a bearing arrangement 70, which is not shown in FIG. 1 but can be seen in FIG. 2. The wind turbine 10 further comprises a generator 40 attached to a rotor 50 of the wind turbine 10. Two wind turbine blades 60.1, 60.2 are attached to the rotor 50.

Figure 2:
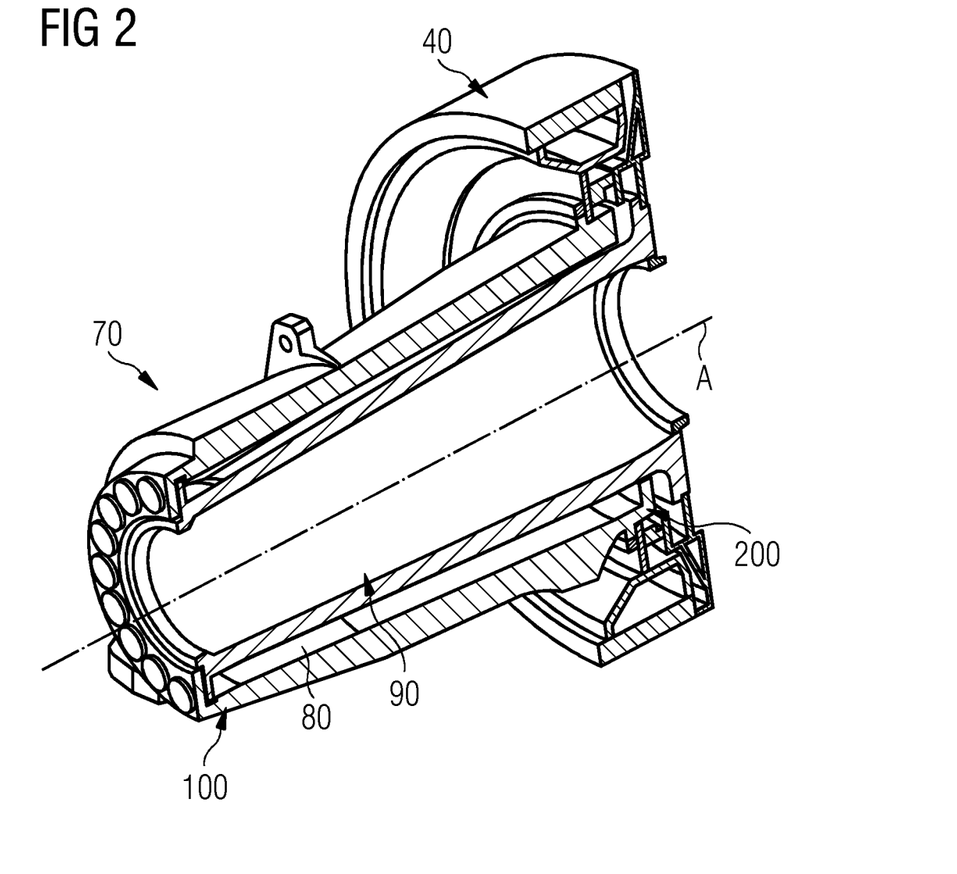
FIG. 2 depicts a side perspective view on a sectional cut along the longitudinal axis of a bearing arrangement of the wind turbine of FIG. 1.

FIG. 2 shows a side perspective view on a sectional cut along the longitudinal axis A of the bearing arrangement 70 of the wind turbine 10 of FIG. 1. The bearing arrangement 70 comprises a bearing housing 80 and a drive shaft 90, whereby the drive shaft 90 is arranged within the bearing housing 80 in an axial direction along the longitudinal axis A of the bearing housing 80 as indicated in FIG. 2. The longitudinal axis A of the bearing housing 80 corresponds to the longitudinal axis A of the drive shaft 90 and thereby is a longitudinal axis A of the bearing arrangement 70. The bearing arrangement 90 further comprises a downwind bearing 100 and an upwind bearing 200 as radial bearings, whereby the downwind bearing 100 and the upwind bearing 200 are arranged between the bearing housing 80 and the drive shaft 90. In particular, the downwind bearing 100 is arranged about a downwind portion of the drive shaft 90 and the upwind bearing 200 is arranged about an upwind portion of the drive shaft 90. The drive shaft 90 is operatively connected to the generator 40. The generator 40 is shown as a direct drive generator. However, it is also possible to provide the generator 40 as a geared generator, for example.

Figure 3:
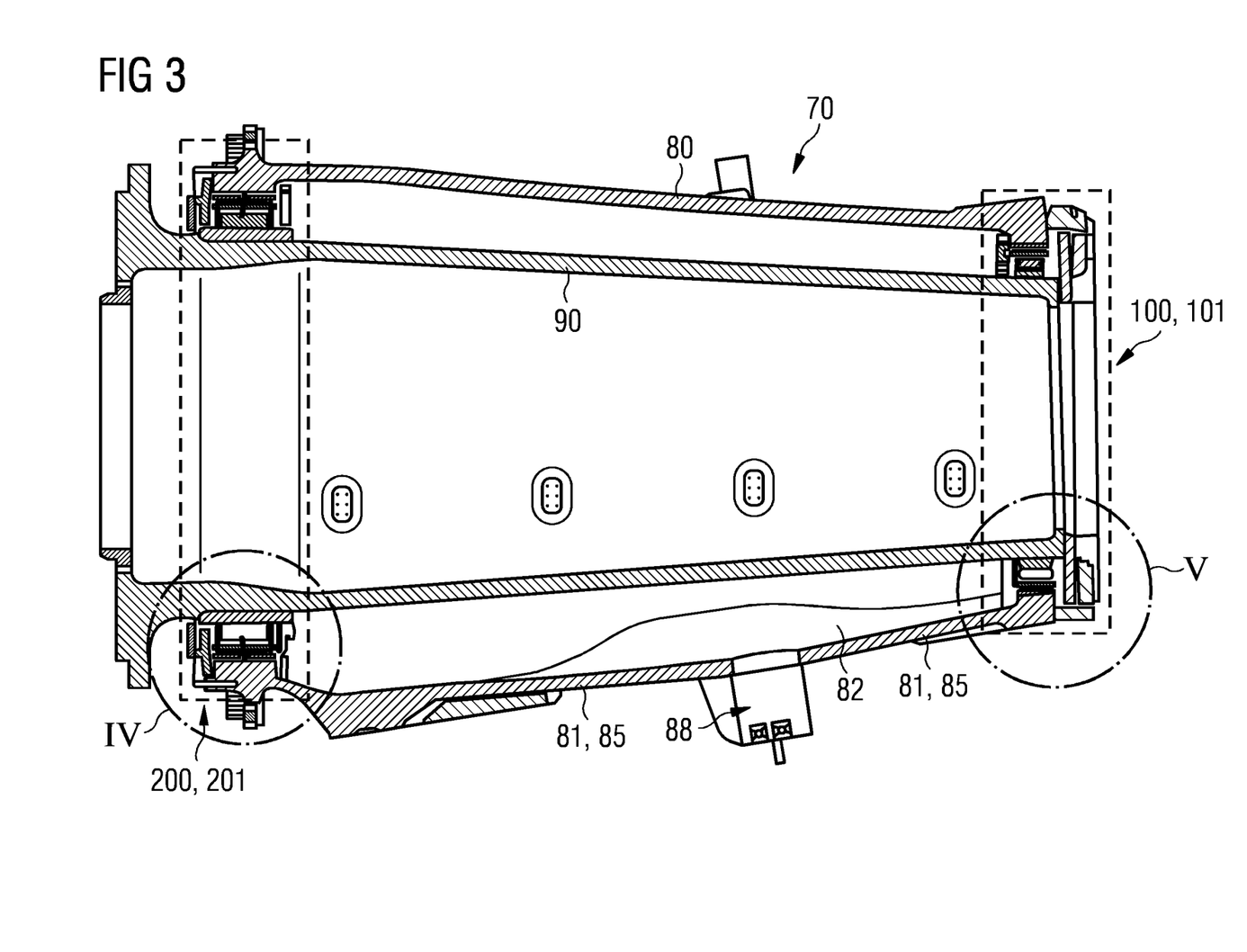
FIG. 3 depicts a side view on a sectional cut along the bearing arrangement of the wind turbine of FIG. 1.

FIG. 3 shows a side view on a sectional cut along the longitudinal axis A of the bearing arrangement 70 of FIG. 2.

An internal space 82 of the bearing housing 80 is formed between the bearing housing 80 and the drive shaft 90. Lubricant may leak from the downwind bearing 100 and the upwind bearing 200 into the internal space 82 and thereby be collected in the bearing housing 80, which is formed as a funnel 85 in a bottom part of the bearing housing 80. A lubricant pump 88 is fluidically connected to a drain outlet (not shown) of the bearing housing 80. Moreover, the downwind bearing 100 comprising a lubricant flooded chamber 101 and the upwind bearing 200 comprising a lubricant flooded chamber 201 are shown, the principle and features of which will further be explained with reference to FIG. 4 and FIG. 5.

Figure 4:
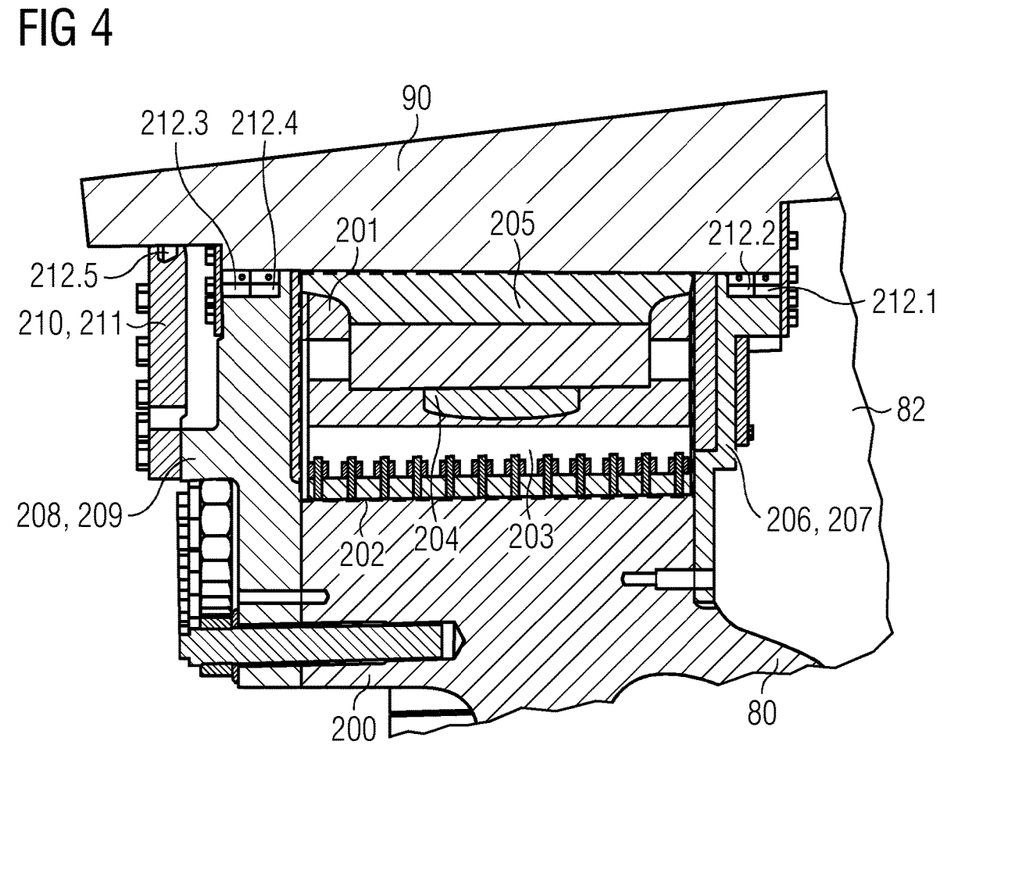
FIG. 4 depicts a view on a detail of the bearing arrangement of FIG. 3.

FIG. 4 shows an enlarged view on the sectional cut through the upwind bearing 200 and its lubricant flooded chamber 201 according to the detail IV of FIG. 3. A radial bearing body 203 is attached to the bearing housing 80. Specifically, the radial bearing body 203 is attached to a cylindrical seat 202 formed in the bearing housing 80. A radial tiltable support structure 204 is secured to the radial bearing body 203. A radial bearing pad 205 is attached to the radial tiltable support structure 204. The radial bearing pad 205 is arranged in sliding contact with the drive shaft 90. The radial tiltable support structure 204 allows for a tilting movement of the radial bearing pad 205. Multiple of such radial bearing units comprising a radial bearing body 203, a radial tiltable support structure 204 and a radial bearing pad 205 are arranged in series along the cylindrical seat 202 in the lubricant flooded chamber 201, in particular along a circumference of the cylindrical seat 202 of the upwind bearing 200.

The lubricant flooded chamber 201 of the upwind bearing 200 is sealed by means of an inner sealing 206 against the internal space 82 of the bearing housing 80. The inner sealing 206 of the lubricant flooded chamber 201 of the upwind bearing 200 comprises multiple inner sealing plates 207. Two lip seals 212.1, 212.2 are arranged in series between the inner sealing 206 and the drive shaft 90 so as to seal the sealing 206 against the drive shaft 90.

The lubricant flooded chamber 201 of the upwind bearing 200 is sealed against an outside of the bearing housing 80 by means of an outer sealing 208 and a dust sealing 210. The outer sealing 208 comprises an outer seal plate 209 and two lip seals 212.3, 212.4 arranged in series in between the outer seal plate 209 and the drive shaft 90. The dust sealing 210 is formed by a dust seal plate 211 and a further lip seal 212.5 arranged between the dust seal plate and the drive shaft 90. The dust sealing 210 is located towards the outside of the bearing housing 80. The dust sealing 210 sandwiches the outer sealing 208 in between the dust sealing 210 and the outer sealing 206.

Figure 5:
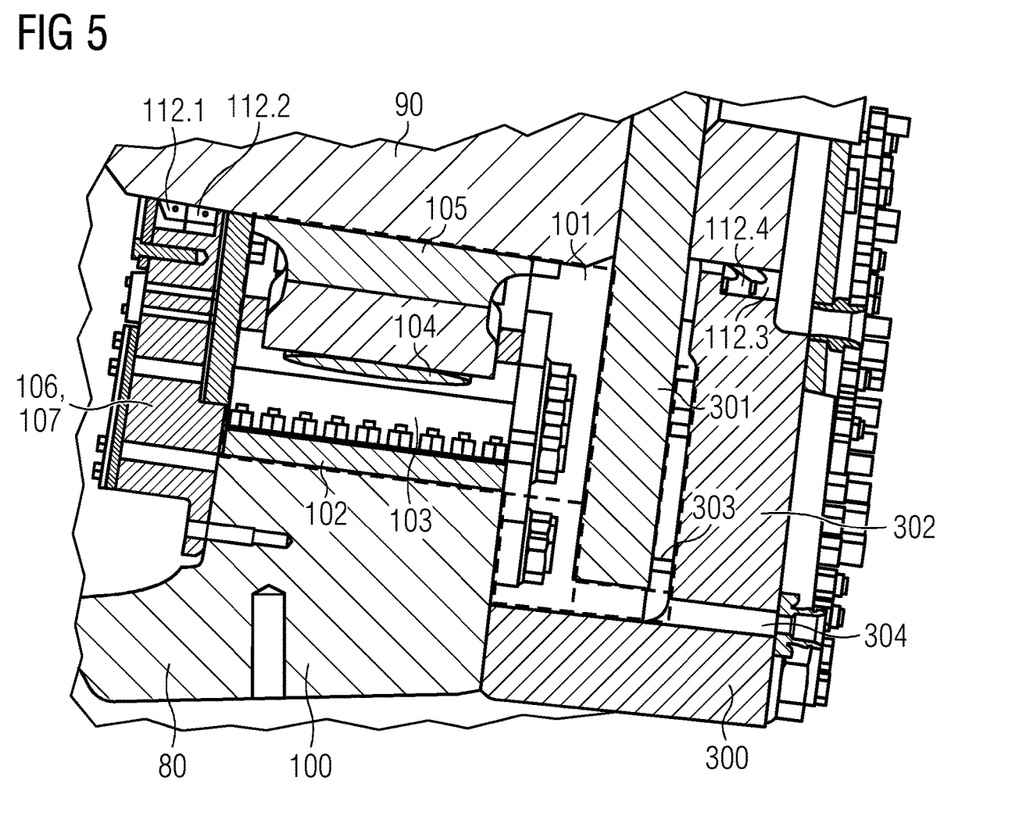
FIG. 5 depicts a view on a further detail of the bearing arrangement of FIG. 3.

FIG. 5 shows an enlarged view on the sectional cut through the downwind bearing 100 and its lubricant flooded chamber 101 according to the detail V of FIG. 3. A radial bearing body 103 is attached to a bearing housing 80. Specifically, the radial bearing body 103 is attached to a cylindrical seat 102 formed in the bearing housing 80. A radial tiltable support structure 104 is secured to the radial bearing body 103. A radial bearing pad 105 is attached to the radial tiltable support structure 104. The radial bearing pad 105 is arranged in sliding contact with the drive shaft 90. The radial tiltable support structure 104 allows for a tilting movement of the radial bearing pad 105. Multiple of such radial bearing units comprising a radial bearing body 103, a radial tiltable support structure 104 and a radial bearing pad 105 are arranged in a series along the cylindrical seat 102 in the lubricant flooded chamber 101, in particular along a circumference of the cylindrical seat 102 of the downwind bearing 100.

The lubricant flooded chamber 101 of the downwind bearing 100 is sealed by means of an inner sealing 106 against the internal space 82 of the bearing housing 80. The inner sealing 106 of the lubricant flooded chamber 101 of the downwind bearing 100 comprises multiple inner sealing plates 107. Two lip seals 112.1, 112.2 are arranged in series between the inner sealing 106 and the drive shaft 90 so as to seal the sealing 106 against the drive shaft 90.

The lubricant flooded chamber 101 is fluidically connected to an effective path provided by a lubricant flow channel 303 of an axial bearing 300 of the bearing arrangement 70. The bearing arrangement 70 with the shown axial bearing 300 is not according to the embodiment of the present invention in that least one axial bearing pad 127 of the axial bearing 300 is not attached to at least one of multiple radial bearing bodies 103. The bearing arrangement 70 according to the embodiment of the present invention will be explained in detail with reference to FIG. 10 to FIG. 12. However, features of the bearing arrangement 70 as shown in FIGS. 2 to 9 may be features of the bearing arrangement 70 according to the embodiment of the present invention as well. The axial bearing 300 as shown in FIG. 5 comprises an axial collar 301 and multiple axial bearing pads (not shown here) attached to an axial bearing stop 302. The axial collar 301 is attached to the drive shaft 90. The axial collar 301 extends outwards from the drive shaft 90. The axial collar 301 extends along an entire circumference of the drive shaft 90. The lubricant flow channel 303 of the axial bearing 300 is formed between the axial collar 301 and the multiple axial bearing pads of the axial bearing stop 302. An overflow channel 304 of the axial bearing 300 is arranged in fluidical contact with the lubricant flooded chamber 101. By means of the overflow channel 304, excessive lubricant may be released out of the lubricant flooded chamber 101. The overflow channel 304 may be connected to the internal space 82 for releasing the lubricant into the bearing housing 80. The downwind bearing 100 has the axial bearing 300 as a sealing of the lubricant flooded chamber 101 against the outside of the bearing housing 80.

Figure 6:
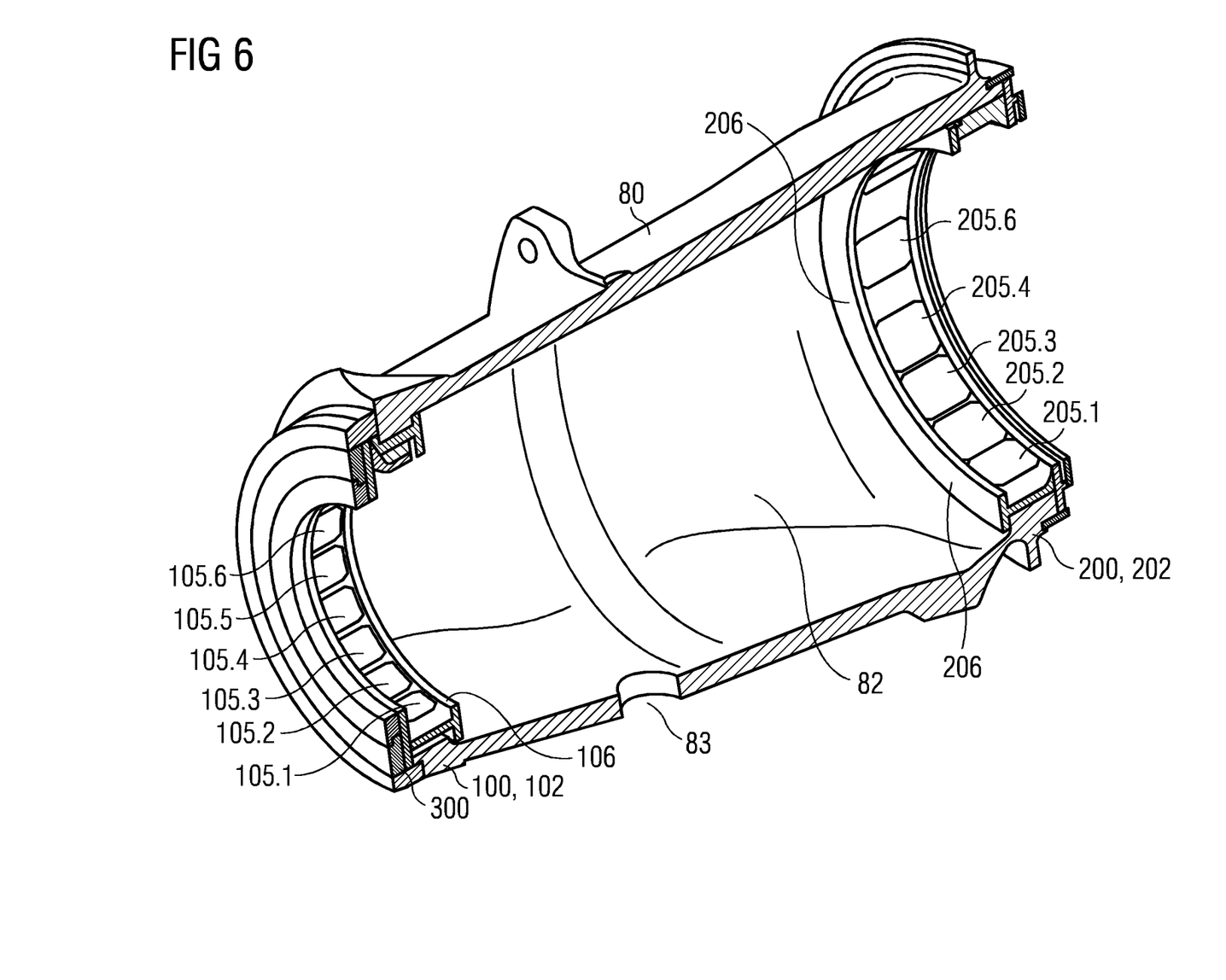
FIG. 6 depicts a side perspective view on a sectional cut along the longitudinal axis of another bearing arrangement of the wind turbine of FIG. 1.

FIG. 6 shows a side perspective view on a sectional cut along the longitudinal axis A of another bearing housing 80 of the wind turbine 10 of FIG. 1 and through the drain outlet 83. As can be seen, there are multiple radial bearing pads 105.1, 105.2, 105.3, 105.4, 105.5, 105.6 arranged as a series at the cylindrical seat 102 of the downwind bearing 100. The inner sealing 106 is arranged between the radial bearing pads 105.1, 105.2, 105.3, 105.4, 105.5, 105.6 and the internal space 82 of the bearing housing 80 and attached to the bearing housing 80, in particular to the cylindrical seat 102. Moreover, the axial bearing 300 is arranged at the bearing housing 80 next to the downwind bearing 100. Moreover, there are multiple radial bearing pads 205.1, 205.2, 205.3, 205.4, 205.5, 205.6 arranged at the cylindrical seat 202 of the upwind bearing 200. An inner sealing 206 is arranged between radial bearing pads 205.1, 205.2, 205.3, 205.4, 205.5, 205.6 and the internal space 82 of the bearing housing 80 and attached to the bearing housing 80, in particular to the cylindrical seat 202.

Figure 7:
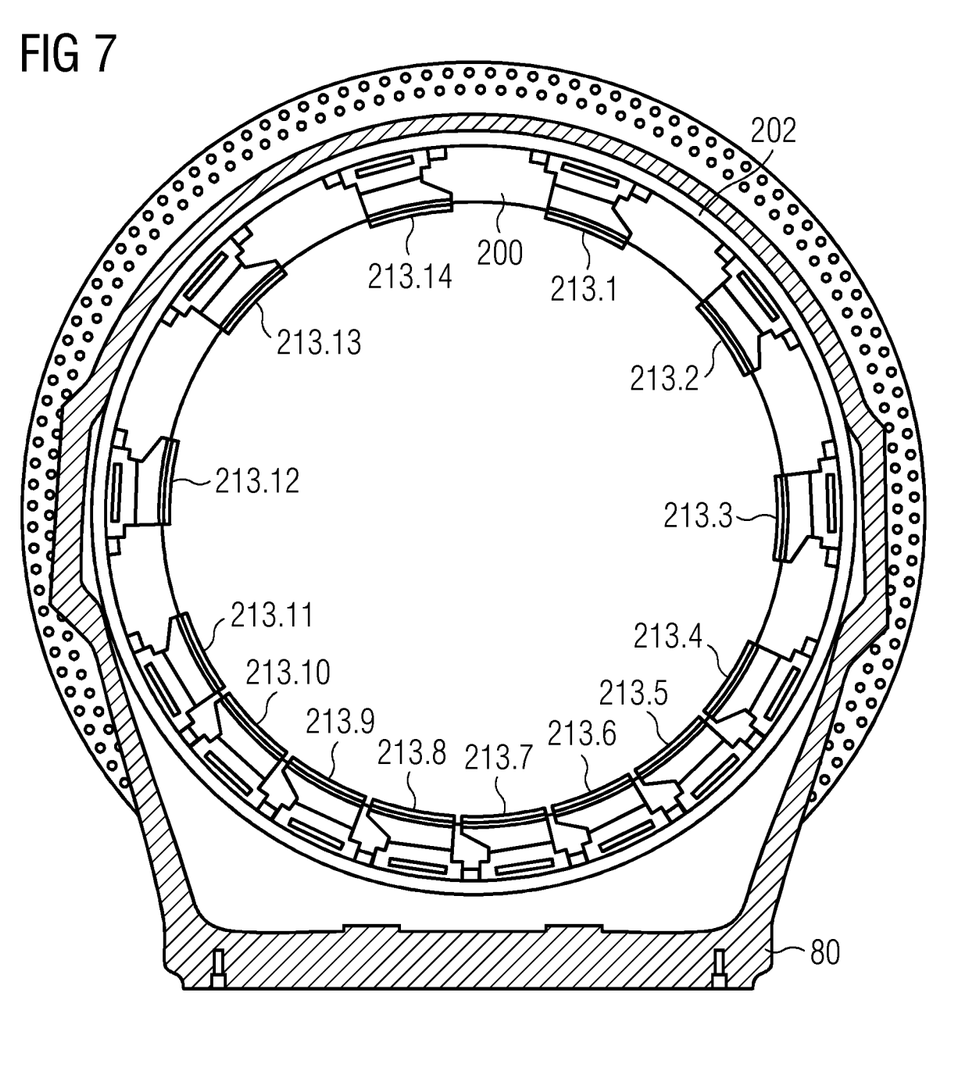
FIG. 7 depicts a front view on a sectional cut through the bearing arrangement of FIG. 6.

FIG. 7 shows a front view on a sectional cut through the bearing arrangement 70 of FIG. 6 of the upwind bearing 200. Multiple radial bearing units 213.1, 213.2, 213.3, 213.4, 213.5, 213.6, 213.7, 213.8, 213.9, 213.10, 213.11, 213.12, 213.13, 213.14 are attached to the cylindrical seat 202 of the upwind bearing 200.

Figure 8:
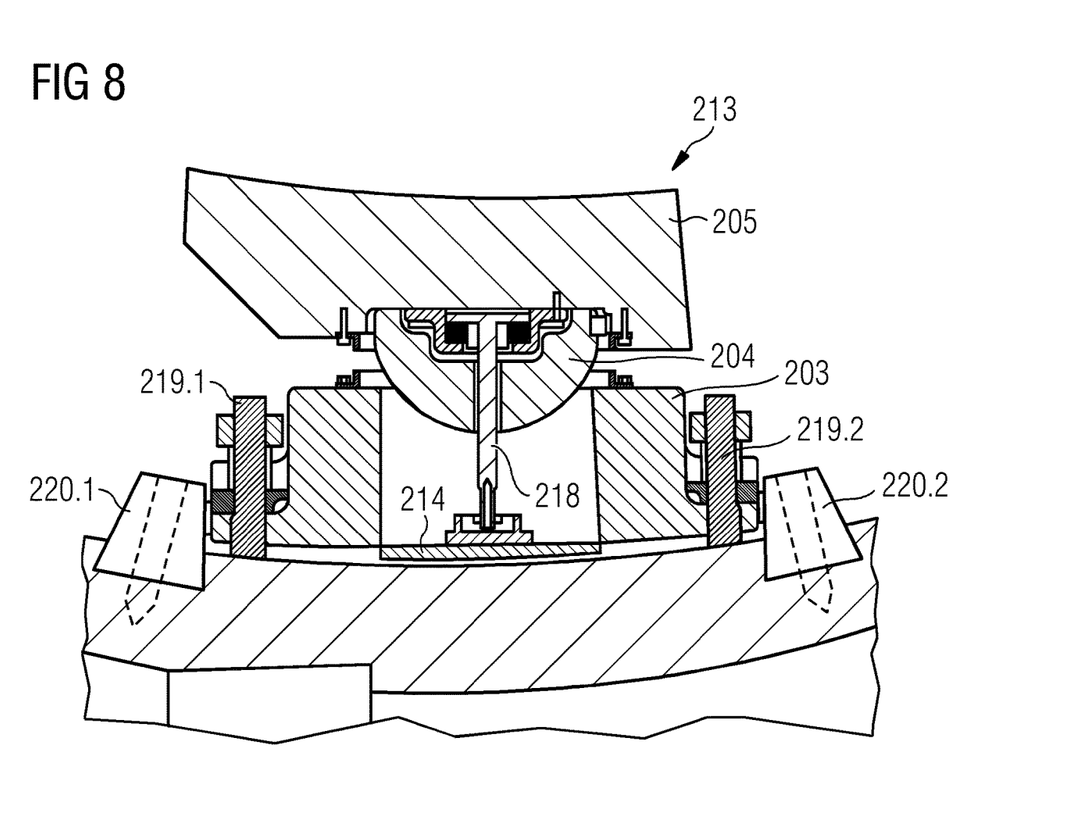
FIG. 8 depicts a view on a detail of the bearing arrangement of FIG. 7 showing a radial bearing unit.

FIG. 8 shows a view on a detail of the bearing arrangement 70 of FIG. 7 showing a sectional cut of the radial bearing unit 213 and its attachment to the cylindrical seat 202 of the bearing housing 80. A curved interface plate 214 is attached to the radial bearing body 203 of the radial bearing unit 213 opposite of the radial bearing pad 205, whereby the interface plate 214 is arranged in contact with a cylindrical seat 202 of the upwind bearing 200 formed as a radial bearing. The radial bearing body 203 comprises a ball socket for the radial tiltable support structure 204, which comprises a ball head resting on the ball socket.

Figure 9:
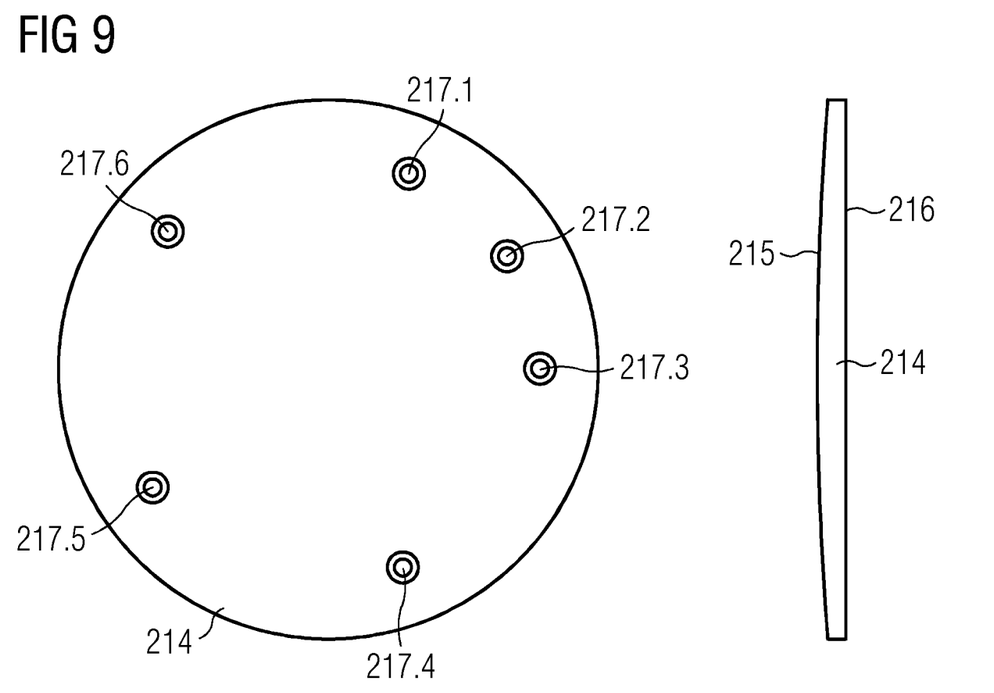
FIG. 9 depicts two views on a curved interface plate as shown in the bearing arrangement of FIG. 8.

As shown in FIG. 9, the interface plate 214 comprises a first interface plate side 215 and a second interface plate side 216. The first interface plate side 215 and the second interface plate side 216 have circular circumferences. In other words, the interface plate 214 has a circular circumference. The first interface plate side 215 is located opposite of the second interface plate side 216. The second interface plate side 216 is plain. The first interface plate side 215 has a curvature corresponding to the curvature of the cylindrical seat 202. Further, the interface plate 214 comprises six interface plate through holes 217.1, 217.2, 217.3, 217.4, 217.5, 217.6 arranged throughout the interface plate 214. In particular, the interface plate through holes 217.1, 217.2, 217.3, 217.4, 217.5, 217.6 are arranged around a center of the interface plate 214.

As further shown in FIG. 8, the interface plate 214 is contacting with its first interface plate side 215 the cylindrical seat 202 of the bearing housing 80. The interface plate is connected by means of the along the sectional cut visible interface plate through hole 217, in which a bolt fastening the interface plate 214 to the radial bearing body 203 may be inserted.

The radial bearing body 203 is fixed to the cylindrical seat by means of two fastening elements 219.1, 219.2, for example bolts, partially extending through the radial bearing body 203 and protruding into the cylindrical seat 202 of the bearing housing 80. The fastening elements 219.1, 219.2 are located opposite of one another in the tangential direction along the circumference of the cylindrical seat 202. The fastening elements 219.1, 219.2 prevent movement of the interface plate 214 and thereby the radial bearing body 203 in a radial direction from the bearing housing 80 to the drive shaft 90.

The radial bearing body 203 is fixed by means of two limit stops 220.1, 220.2 arranged in grooves of the cylindrical seat 202 of the bearing housing 80 so as to prevent a movement of the interface plate 214 and thereby the radial bearing body 203 in a tangential direction along the circumference of the cylindrical seat 202. The two limit stops 220.1, 220.2 are therefore arranged adjacent to and in contact with the radial bearing body 203 in a tangential direction along the circumference of the cylindrical seat 202 and opposite of each other in the tangential direction.

Figure 10:
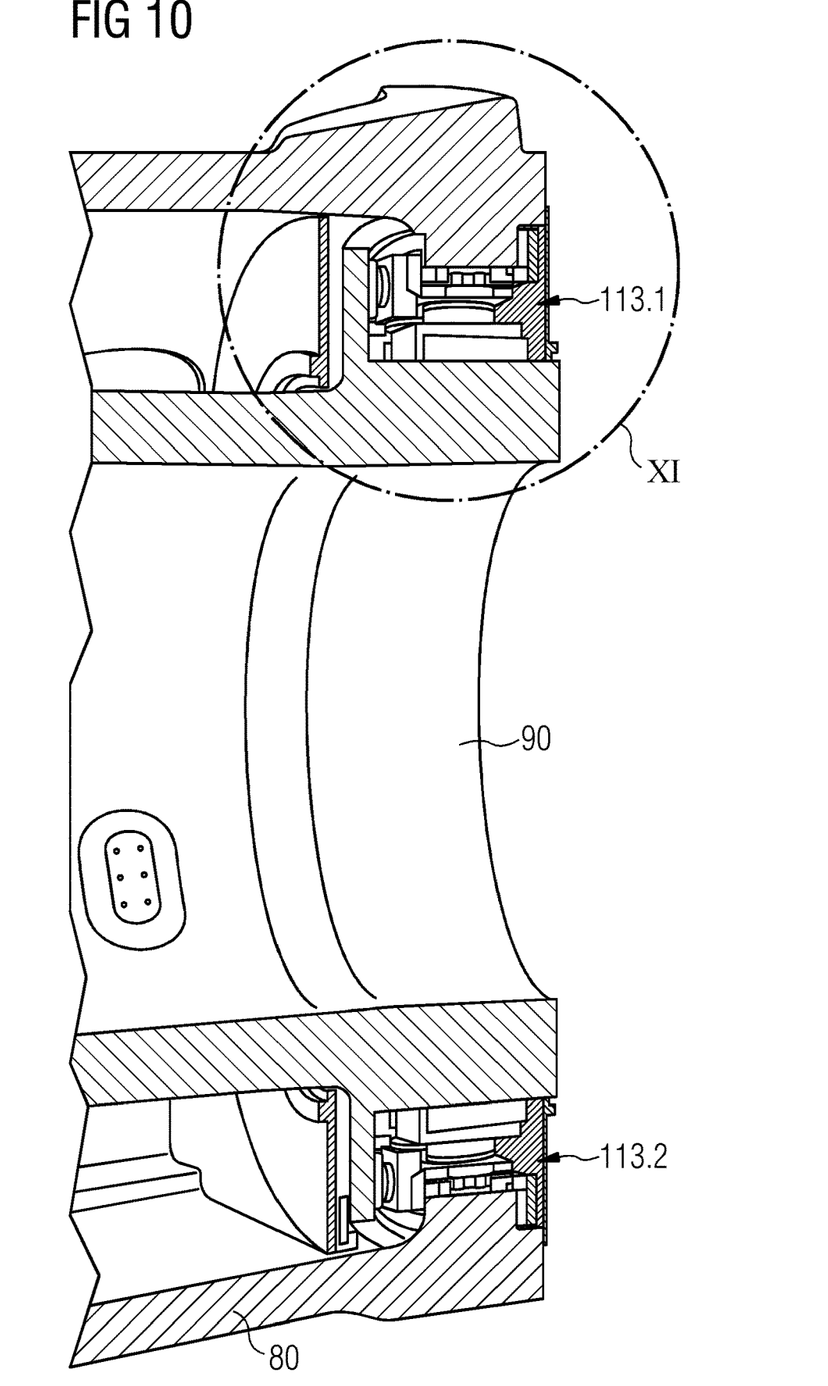
FIG. 10 depicts a front view on a section of a sectional cut through another bearing arrangement of the wind turbine of FIG. 1.

FIG. 10 shows a front view on a section of a sectional cut through another bearing arrangement 70 of the wind turbine 10 of FIG. 1. The section is an end section showing the downwind bearing 100 arranged between the bearing housing 80 and the drive shaft 90. Two radial bearing units 113.2 of the downwind bearing 100 are visible and denominated. Multiple of such radial bearing units 113.2 are arranged in series in the downwind bearing 100.

Figure 11:
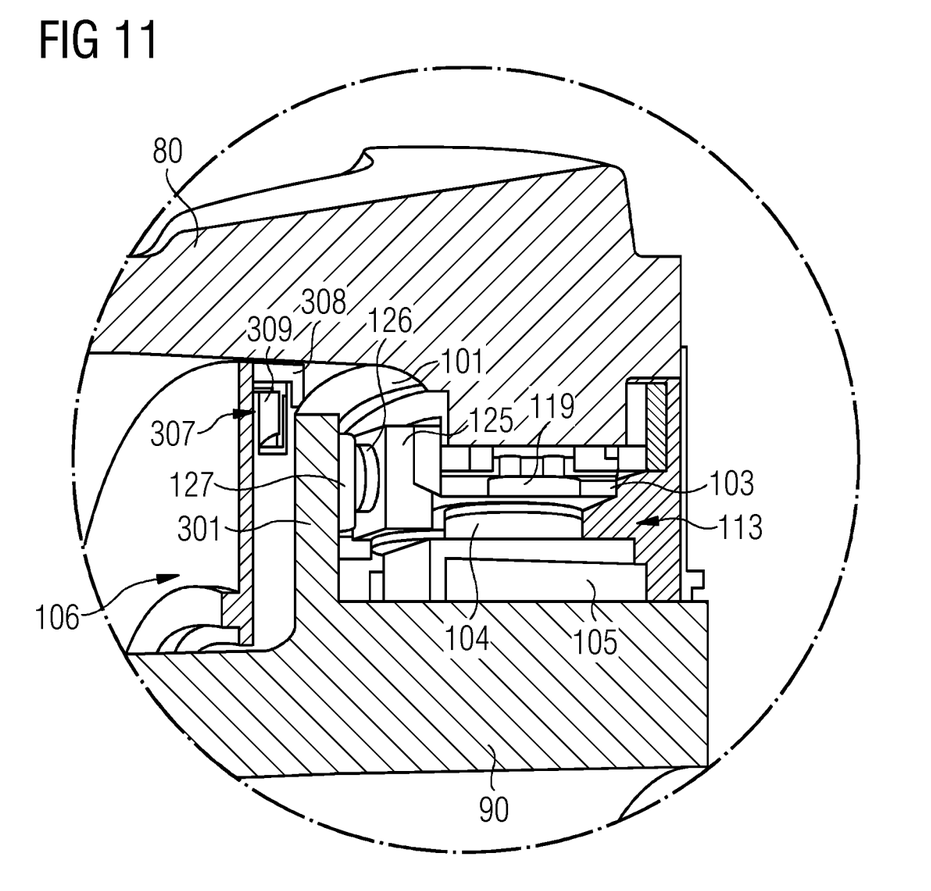
FIG. 11 depicts a view on a detail of the bearing arrangement of FIG. 10.

FIG. 11 shows a view on a detail XI of the bearing arrangement 70 of FIG. 10 showing inter alia the radial bearing unit 113. The radial bearing unit 113 is attached to the cylindrical seat 101 of the bearing housing 80 by means of the radial bearing body 103 of the radial bearing unit 113, whereby the radial bearing body 103 is secured to the bearing housing 80 by means of the fastening element 119. Further, the radial bearing pad 105 is attached to the radial bearing body 103 by means of the radial tiltable support structure 104.

An axial bearing pad 127 of the axial bearing 300 is attached to the radial bearing body 103 of the downwind bearing 100 by means of the axial tiltable support structure 126. The axial tiltable support structure 126 is attached to a radial bearing body protrusion 125, which is integrally formed with the radial bearing body 103. The radial bearing body protrusion extends in an axial direction along the longitudinal axis A.

The axial bearing pad 127 and the radial bearing pad 105 are enclosed in the common lubricant flooded chamber 101. The lubricant flooded chamber 101 is sealed against the drive shaft 90, an internal space 82 of the bearing housing 80 by means of the inner sealing 106 and an outside of the bearing housing 80 by means of an outer sealing. Thereby, the axial bearing pad 127 and the radial bearing pads 105 are fluidically connected to each other.

When there is positive thrust from the wind in an axial direction along the longitudinal axis A, i.e. from the axial collar 301 towards the axial bearing pad 127, the axial collar 301, which is integrally formed with the drive shaft 90 and arranged around an entire circumference of the drive shaft 90, the axial collar 301 is pressed against the axial bearing pad 127 and the thrust is being transferred via the radial bearing body protrusion 125 to the radial bearing body 103 and from there to the bearing housing 80. The axial tiltable support structure 126 is tiltable with respect to the axial collar 301. By means of the tiltable functionality of the axial bearing 300, tolerances between the axial collar 301 and the axial bearing pad 127 are compensated for.

Further, when there is negative thrust in the opposite direction, i.e. from the axial collar 301 towards the inner sealing 106, the axial collar 301 is pressed against a slack bearing pad 309 of the axial bearing 300. Multiple of such slack bearing pads 309 are arranged along an entire circumference of the bearing housing 80 by means of a flange 308. The slack bearing pads 309 are arranged opposite of a second contacting surface of the axial collar 301, wherein the second contacting surface is arranged facing an opposite direction of a first contacting surface of the axial collar 301, wherein the first contacting surface of the axial collar 301 is arranged facing the axial bearing pad 127.

Figure 12:
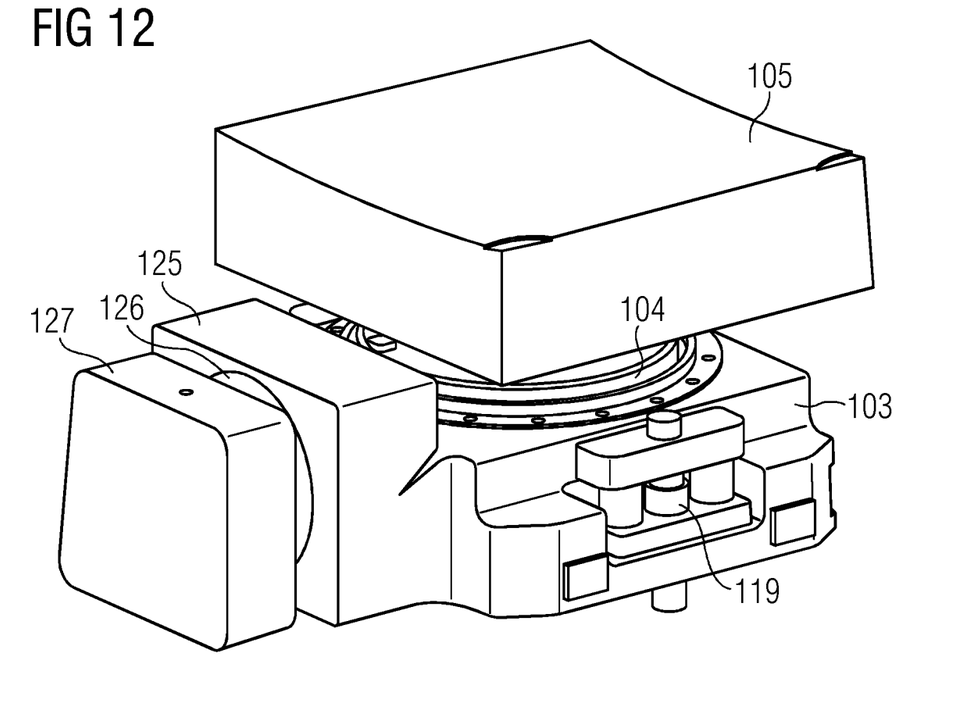
FIG. 12 depicts a further view on a detail of the bearing arrangement of FIG. 11.

FIG. 12 shows a radial bearing unit 113 the bearing arrangement 70 of FIG. 11 as used in the downwind bearing 100 of the bearing arrangement 70 of FIG. 11. It can be clearly seen that the radial bearing body protrusion 125 is integrally formed with the radial bearing body 103 and the axial tiltable support structure 126 is attached to the radial bearing body protrusion 125 and further the axial bearing pad 127 is attached to the axial tiltable support structure 126, for example, by means of a spring system (not shown). The axial tiltable support structure 126 and the radial tiltable support structure 104 may comprise the same parts. In particular, the axial tiltable support structure 126 may comprise a ball head. Further, the radial bearing body protrusion 125 may comprise a ball socket for the ball head and the ball head may be movably rested in the ball socket.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed:

1. A bearing arrangement for a wind turbine comprising:
   a bearing housing;
   a drive shaft arranged within the bearing housing in an axial direction along a longitudinal axis of the bearing housing;
   a downwind bearing; and
   an upwind bearing, wherein the downwind bearing and the upwind bearing are arranged between the bearing housing and the drive shaft;
   wherein the downwind bearing and/or the upwind bearing is a radial bearing comprising multiple radial bearing pads, and each one of the multiple radial bearing pads is attached to one of a multiple radial bearing bodies of the radial bearing and the multiple radial bearing pads are arranged about the drive shaft;
   wherein the downwind bearing and/or the upwind bearing is connected to an axial bearing of the bearing arrangement, and at least one axial bearing pad of the axial bearing is attached to at least one of the multiple radial bearing bodies, the at least one of the multiple radial bearing bodies comprising a radial bearing protrusion extending in axial direction along the longitudinal axis, the at least one axial bearing pad being attached to the radial bearing protrusion;
   wherein the axial bearing and the radial bearing are both arranged between the drive shaft and the bearing housing.

2. The bearing arrangement according to claim 1, wherein the at least one axial bearing pad is attached to the radial bearing protrusion by means of an axial tiltable support structure.

3. The bearing arrangement according to claim 1, wherein the at least one axial bearing pad and at least one of the multiple radial bearing pads are fluidically connected to each other.

4. The bearing arrangement according to claim 1, wherein the at least one axial bearing pad and the multiple radial bearing pads are enclosed in a common lubricant flooded chamber, whereby the lubricant flooded chamber is sealed against the drive shaft, an internal space of the bearing housing and an outside of the bearing housing.

5. The bearing arrangement according to claim 1, wherein the axial bearing comprises an axial collar arranged opposite of the at least one axial bearing pad.

6. The bearing arrangement according to claim 5, wherein the axial bearing comprises at least one slack bearing pad arranged opposite of a second contacting surface of the axial collar, wherein the second contacting surface is arranged facing an opposite direction of a first contacting surface of the axial collar, wherein the first contacting surface of the axial collar is arranged facing the at least one axial bearing pad.

7. The bearing arrangement according to claim 6, wherein the at least one slack bearing pad is attached to the bearing housing, in particular by means of a flange.

8. The bearing arrangement according to claim 1, wherein the axial collar is arranged about a circumference of the drive shaft.

9. The bearing arrangement according to claim 1, wherein the axial collar is coated with a hardened material.

10. The bearing arrangement according to claim 1, wherein the multiple radial bearing bodies are arranged adjacent to one another along a circumference of a cylindrical seat.

11. The bearing arrangement according to claim 1, wherein each one of the multiple radial bearing pads is attached to one of the multiple radial bearing bodies by means of a radial tiltable support structure.

12. A wind turbine comprising the bearing arrangement according to claim 1, wherein the wind turbine further comprises a rotor operatively connected to drive the drive shaft and a generator operatively connected to be driven by the drive shaft.

* * * * *